United States Patent [19]
Muller

[11] 3,941,175
[45] Mar. 2, 1976

[54] CONNECTING LINK, ESPECIALLY FOR TIRE CHAINS

[75] Inventor: Anton Müller, Unterkochen, Germany

[73] Assignee: Eisen- und Drahtwerk Erlau Aktiengesellschaft, Aalen, Wurttemberg, Germany

[22] Filed: May 7, 1974

[21] Appl. No.: 467,727

[30] Foreign Application Priority Data

May 17, 1973 Germany .......... 2325004

[52] U.S. Cl. .......... 152/242; 152/232
[51] Int. Cl.² .......... B60C 27/04
[58] Field of Search .......... 152/243, 244, 241, 242, 152/231, 232; 403/339, 340, 364; 24/241 SL, 241 CH

[56] References Cited

UNITED STATES PATENTS

| | | | |
|---|---|---|---|
| 271,141 | 1/1883 | Simons et al. | 24/241 CH |
| 2,109,068 | 2/1938 | Kinnear | 152/242 X |
| 2,185,921 | 1/1940 | McNaught | 152/242 |
| 3,812,896 | 5/1974 | Witzel et al. | 152/242 |

*Primary Examiner*—Drayton E. Hoffman
*Assistant Examiner*—Stack, Jr. Norman L.
*Attorney, Agent, or Firm*—Walter Becker

[57] ABSTRACT

A connecting link, especially for tire chains in which an annular link body is provided with a gap on one side for the introduction of links into the body. A closure member is provided which is receivable in the gap and which is adapted for connection to the link body. When the closure member is disposed in the gap it forms substantially a continuation of the link body so that the assembly has a smooth contour throughout the periphery thereof.

3 Claims, 4 Drawing Figures

23
4
12
9
28
26
29
30
25
22
8
1

13
18
21
27
20
4
19
22
24
15
1
7
5
10

18
2
II
21
19
26
22
24
25
20
30
III
4
16
12
4
15
14
9
29
11
III
17
8
3
1
7
6
5
II
10

2a
21a
18a
9a
4a
19a
22a
14a
26a
15a
20a
17a
11a
24a
8a
31
10a
7a
3a
5a
1a
6a

CONNECTING LINK, ESPECIALLY FOR TIRE CHAINS

The present invention relates to connecting links for tire chains with an open link body which in the form of a ring surrounds a receiving opening and at least within the region of said receiving opening is of a round cross section. The link body forms an inlet opening between two oppositely located leg ends and is provided with a closing member to be arranged at the leg ends, said closing member having a closing surface facing toward the axis of said receiving opening.

It is an object of this invention so to design a connecting link of the above mentioned general type that the chain links which engage said connecting link, especially the web shaped running links of a tire chain will substantially have the same movability relative to the connecting link as they would have relative to a closed for instance welded annular link.

These and other objects and advantages of the invention will appear more clearly from the following specification in connection with the accompanying drawings, in which.

The connecting link according to the present invention is characterized primarily in that with the closing member in inserted position, the closing surface of said closing member forms an intermediate surface of the inner surface of the receiving opening which extends around the axis of the receiving opening adjacent thereto in a substantially gapless manner, said closing surface having a rounded cross section similar to the receiving opening. Thus, the connecting link can turn about the axis of its receiving opening relative to the chain links engaging said connecting link so that the latter will be uniformly worn. Furthermore, this design makes it possible also within the region of the closing member to select the angle of engagement between adjacent interengaging chain links very small for instance so that these adjacent chain links nearly contact each other so that with the connecting link according to the invention also the manufacture of relatively narrow mesh orthorhombic shaped chain configuration will be possible.

Figure 3:
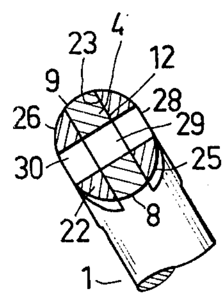
FIG. 3 is a portion of section taken along the line III—III of FIG. 1 of approximately the same as FIG. 2.
Figure 2:
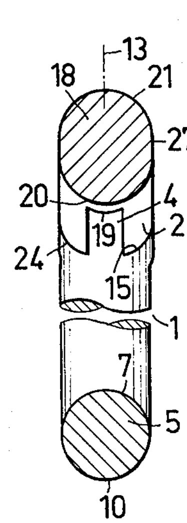
FIG. 2 shows a section through a connecting link in approximately natural size, said section being taken along the line II—II of FIG. 1.
Figure 1:
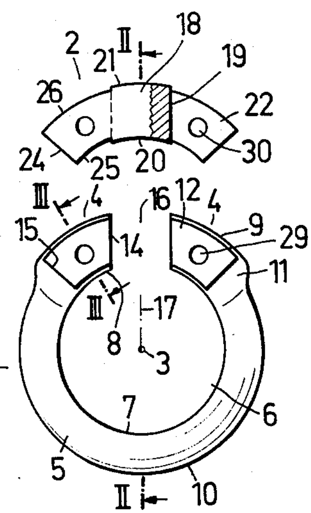
FIG. 1 illustrates an exploded view of a connecting link according to the invention, said connecting link being shown at about the natural scale.

Referring now to the drawings in detail, a connecting link according to the invention illustrated in FIGS. 1–3 has a link body 1 which extends annularly within the region of its inner surface over an arc angle of approximately 315° about an axis 3. The connecting link furthermore comprises a closing member 2 which without a gap merges with the link body 1. The closing member 2 is disengageably connectable to the leg ends 4 of the link body 1. If the connecting link is to be made as light as possible, and if within the region of the closing member 2 a reduction in the cross section of the connecting link exists, it is expedient to form the connecting link somewhat thicker within the region of the closing member 2. This thickened section is preferably arranged exclusively at a right angle with regard to the receiving opening so that the connecting link is suitable particularly for engaging oblong shaped engaging openings of the other chain links with which the longitudinal extension of the oblong hole shaped engaging openings is approximately parallel to the plane of the connecting link and thus at the right angle with regard to the axis of the receiving opening.

The section 5 of the link body 1 which section interconnects the leg ends 4 and extends over an arc angle of approximately 235° has according to FIG. 2 circular cross sections the diameter of which corresponds approximately to 3/11 of the inner diameter of the link body 1. The cross sections of the leg ends 4 are according to FIG. 3 located in oval enveloping surfaces the greater cross sectional extension of which is at a right angle to the axis 3 while that inner surface 8 of said oval enveloping surfaces which face toward the axis 3 form a steady continuation of the remaining inner surface 7 of the receiving opening 6 surrounded by the link body 1. These inner surfaces 8 are in their cross section according to FIG. 3 curved with approximately the same radius of curvature as the section 5 of the link body 1. The outer surfaces 9 of the leg ends 4 are in view according to FIG. 1 likewise curved around the axis 3 but are relative to the outer surface 10 of Section 5 of the link body 1 radially offset outwardly and in the cross section according to FIG. 3 are curved with the same radius as the inner surfaces 8. The leg ends 4 merge with the section 5 through merging areas 1, said section 5 having different cross sections. The merging areas 1 extend from the outer surfaces 9, 10 to the range of the greatest thickness of the link body 1 and form swayed rounded outer surfaces as merging surfaces. Due to the described design, favorable sliding and wearing conditions are obtained between the connecting link and the engaging chain links.

For simplifying the assembly, each link end 4 has two plane side surfaces 12 extending at a right angle with regard to axis 3, and within the region of said surfaces 12 has a thickness which amounts to approximately two-fifths of the cross sectional diameter of section 5. These side surfaces 12 are symmetrical with regard to the central plane 13 of the connecting link, said central plane being at a right angle to the axis 3. The side surfaces 12 which extend around the axis 3 extend to the end surfaces 14 of the leg ends 4 and to shoulder surfaces 15 which are approximately at a right angle to said side surfaces 12. The shoulder surfaces 15 are located in axial planes passing through the axis 3. Those planes which are located in the shoulder surfaces 15 of both leg ends 4 are provided at an angle of approximately 96° with regard to each other. Thus, the shoulder surfaces 15 are located directly adjacent to the merging portions 11.

For purposes of obtaining a compact construction, the end surfaces 14 of the leg ends 4 form lateral surfaces of an inlet opening 16 which are parallel to each other. The width of said inlet opening 16 corresponds to approximately three-eighths of the diameter of the receiving opening 6 and is designed symmetrically with regard to an axial plane 17 of the axis 3 so that during the assembly it is not necessary to consider the position of the connecting link. The leg ends 4 may form a substantially continuous continuation so that section 5 of link body 1 which interconnects the leg ends 4, said sections 5 extending about the axis 3 of the receiving opening 6. In view of the parallel side surfaces, the greatest distance between the leg ends 4 may be selected very short.

The closing member 2 which is designed symmetrically with regard to the planes 13, 17 and can be equally well arranged in two positions angularly offset with regard to each other has an intermediate filling member 18. For purposes of obtaining a high strength, this filling member 18 has oval cross sections in conformity with the above mentioned surface and fills the inlet opening 16 completely in such a way that by means of engaging surfaces 19 which are parallel to each other engages the end faces 14 substantially over its entire surface while its closing surface 20 which faces toward the axis 3 merges substantially without gap and without step with the inner surface 8 of the leg ends 4 and more specifically up to the side edges of the side surfaces 12 of leg ends 4. Similarly, the outer surface 21 of the filling member 19 merges with the gaps with the outer surfaces of the leg ends 4. This outer surface 21 is curved about the axis 3 with the same radius as the outer surfaces 9. For purposes of obtaining a safe hold and a simple assembly, two connecting legs 22 project beyond the engaging surface 19 of the filling member 18 which has full cross sections. The legs 22 when viewed parallel to the axis 3 have substantially the same shape as the side surfaces 12 and with their plane surfaces 23 which face each other respectively from a receiving slot for the pertaining leg ends 4. The closing member 2 may also as filling member be located only between the side surfaces of the inlet opening. Furthermore, the respective leg end of the link body may be fork shaped, and the closing member 2 may comprise the engaging extension in the form of connecting legs. The side surfaces 23 which extend at a right angle with regard to the axis 3 are so designed that they have substantially the same contour as the side surfaces 12 and are provided for engagement approximately over their entire surface with the side surfaces 12 so that the closure member can be placed at the right angle to the axis of the receiving opening upon the leg ends or be withdrawn therefrom while the closing member is during its removal moved away from the axis of the receiving opening. Instead thereof or in addition thereto it is with a corresponding design of the connecting leg and the leg ends also possible that the closing member is for mounting or withdrawal moved parallel to the axis of the receiving opening. The two connecting legs 22 which are respectively located opposite form with the engaging pertaining leg ends 4, in cross section according to FIG. 3, substantially oval full cross sections. These oval cross sections equal the oval cross sections of the filling member 18 and merge with the same in uninterrupted manner. The end faces 24 of the connecting legs 22 are for purposes of fixing the position provided for engagement with the shoulder surfaces 15. This is particularly expedient with parallel side surfaces of the inlet opening because in such an instance, by engagement of the shoulder surface by said end surface, the closing member will be aligned relative to the link body. Within the region of the leg ends 4, the inner surfaces 25 of the closing member 2 and the inner surfaces 8 of the leg ends 4 intersect in the direction around the axis 3 as is the case with regard to the outer surfaces 26, 9. The side surfaces 28 which pertain to the connecting legs 22 located respectively opposite to each other and which face away from each other form an uninterrupted continuation of the corresponding side surfaces 27 of the filling member 18 which project slightly beyond the side surfaces of the section 5.

As illustrated in FIGS. 11 and 3, each leg end 4 of the link body 3 has a bore 29 which is parallel to the axis 3. The bore 29 has a diameter approximately equaling the thickness of the respective leg end 4. The bore 29 is located approximately in the middle between the pertaining inner surface 8 and the pertaining outer surface 9 and also approximately in the middle of the extension of the two pertaining annular segmental side surfaces 12 around the axis 3. When the closing members 2 have been inserted, these bores 29 are in axial alignment with approximately equally large bores 30 in the connecting legs 22. These bores 30 are likewise designed as bores extending all the way through. By pressing in disengageable pins, especially spring cotter and spiral pins into the bores 29, 30, the closing member 2 can be secured relative to the link body 1 in the described position in which instance the pins are expediently formed with the side surfaces 28 of the connecting legs 22 and can be hammered in from both sides and can be driven out toward both sides. It is also possible to arrange the safety bolt parallel to the plane of the connecting link for instance at right angle with regard to the central plane of the inlet or introducing opening.

Figure 4:
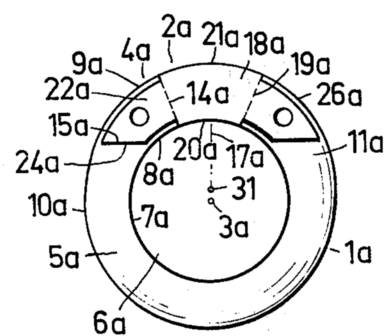
FIG. 4 is a view of a modified connecting link in assembled condition.

In FIG. 4 the corresponding parts have been designated with the same reference numerals as in FIGS. 1–3, however, with the additional letter *a*. The connecting link according to FIG. 4 has substantially the same cross sections as in FIGS. 2 and 3.

With the embodiment according to FIG. 4, the end surfaces **14*a* of the leg ends 4*a* of the link body 1*a* are provided in axial planes of the axis 3*a* of the receiving opening 6*a* in such a way that the introducing opening when viewed parallel to the axis 3*a* is at an angle of approximately 45° narrowing in the direction toward the axis 3*a*. In this way the introducing opening on the outside of the connecting link is relatively wide so that the engaging chain links can be easily introduced in the engaging surfaces 19*a* of the filling member 2*a* are correspondingly inclined. All shoulder surfaces 15*a* of the leg ends 4*a* are located substantially in a common plane which is located at a right angle of the axial plane 17*a* of the axis 3*a*, said axial plane 17*a* forming the central plane for the introducing opening. The end surfaces 24 of the connecting legs 22*a* of the closing member 22*a* are provided approximately in the same plane. This is expedient particularly with side surfaces of the introducing opening when the side surfaces are located at an angle with regard to each other. In such an instance the engaging surfaces of the closing member which engage the side surfaces of the introducing opening see to it that the closing member is aligned relative to the link body. The inner surfaces 7*a*, 8*a*, 20*a* form a closed circular surface around the axis 3*a*. The outer surfaces 9*a* of the leg ends 4*a* and the outer surfaces 21*a*, 26*a* of the closing member 29*a* extend, however, in view parallel to the axis 3*a* around a further axis 31 which is parallel to the axis 3*a* and located in the axial plane 17*a*. The axis 31 is located closer than the axis 3*a* with the introducing opening and the closing member 2*a* so that the outer shape of the connecting link according to the view of FIG. 4 is flat oval and the cross sectional thickness witin the range of the closing member is relatively greater than in the oppositely located range of the link body. The space between the axis 3*a*, 31 amounts, however, only to approximately one-fourth of the cross sectional diameter of the section 5***a* of link body 1*a*. The radius of curvature of the outer surfaces 9*a*, 21a around the axis 31 is the same. As a result thereof, a still more harmonic transition between the outer surfaces 9, 10 is realized because the merging sections 11*a* of oval cross section merge at the center of the filling section 18*a* through the intervention of a relatively large arc angle in a continuous manner with the circularly round cross sections of the section 5*a* of link body 1*a*.

As will be evident from the above, the connecting link according to the invention is suitable for instance as replacement or repair link for annular links of a tire chain which have broken. The arrangement may be such that the connecting link according to the invention can be mounted with a minimum of tools, on the tire chain engaging the motor vehicle tire. The connecting link according to the invention is, however, also suitable for an initial arrangement in new tire chains while as ring links of such tire chains a more or less higher number of connecting links may be employed. Expediently, exclusively all connecting links according to the invention are employed as ring members so that the tire chain can at any desired area be lengthened, shortened or repaired. Furthermore, with this design, there exists the advantageous possibility to subject the connecting links according to the invention alone to a heat treatment and to make the chain links engaging said connecting links of a suitable material for instance manganese steel which cannot be refined by heat treatment.

It is also possible instead of arranging the connecting link according to the invention as horizontal link in the plane of the stretched-out chain, to provide the connecting link according to the invention as vertical link located transverse or at a right angle to said plane.

It is, of course, to be understood that the present invention is, by no means, limited to the specific showing in the drawing but also comprises any modification within the scope of the appended claims.

What is claimed is:

1. A composite connecting link for a tire chain made of two parts fixed together in which the complete link has a substantially smooth, continuously curved interior periphery, said link on each side being tangent about its circumference to a plane perpendicular to the axis of said link so that said link is of uniform axial thickness throughout its entire length, the first part of said link extending about a major portion of the circumference of said link and having a gap for receiving the ends of adjacent tire chain links, the second part having a section to fit in said gap between the ends of said first part and being symmetrical about an axial plane through its center, the ends of said two parts having complementary, interfitting ends, each end on one part having a pair of axially spaced legs having a total axial thickness of the thickness of said link, and forming a slot between said legs, the sides of said slot lying in planes perpendicular to the axis, each of the complementary ends of the other part having a projection formed with flat sides lying in planes perpendicular to the axis to fit between the flat sides of said slot, the ends of said second part having end surfaces at an angle to an axial plane and complementary surfaces on the first part to be engaged by the end surfaces on said second part and limit movement of said second part inwardly of said first part, and means through the interfitting ends of said parts to secure said parts together to form a complete ring, the uniform axial thickness of said composite link and the smooth, continuous internal periphery allowing a chain link connected thereto to move freely about said composite connecting link.

2. A connecting link as claimed in claim 1, in which said composite link in a radial cross section at any point forms a semicircle inwardly of its axial diameter.

3. A connecting link as claimed in claim 1, in which the ends of said first part are thicker radially than axially, and said second part is also thicker radially than axially to correspond to said radially thickened ends, said thickened ends merging into the adjacent portions of said first part.

* * * * *